United States Patent [19]
Asaka et al.

[11] 3,830,206
[45] Aug. 20, 1974

[54] DUAL THROTTLE VALVE CONTROL FOR INTERNAL COMBUSTION ENGINE

[75] Inventors: Urataro Asaka, Kamifukuroka; Yuji Tanaka, Tokyo, both of Japan

[73] Assignee: Honda Giken Kogyo Kabushiki Kaisha, Tokyo, Japan

[22] Filed: May 29, 1973

[21] Appl. No.: 364,545

[30] Foreign Application Priority Data
May 31, 1972 Japan.............................. 47-63278

[52] U.S. Cl....... 123/32 ST, 123/32 SPA, 123/127, 123/75 B
[51] Int. Cl. ..... F02b 3/00, F02b 19/10, F02b 19/16
[58] Field of Search......... 123/32 ST, 32 SPA, 127, 123/119 R, 75 B

[56] References Cited
UNITED STATES PATENTS

| | | | |
|---|---|---|---|
| 2,317,625 | 4/1943 | Mallory.............................. | 123/75 B |
| 3,092,089 | 6/1963 | Dolza.............................. | 123/75 B |
| 3,364,911 | 1/1968 | Baudry.............................. | 123/127 |
| 3,512,510 | 5/1970 | Manning.............................. | 123/127 |
| 3,659,564 | 5/1972 | Suzuki.............................. | 123/32 ST |

*Primary Examiner*—Laurence M. Goodridge
*Assistant Examiner*—Ronald B. Cox
*Attorney, Agent, or Firm*—Lyon & Lyon

[57] ABSTRACT

A dual throttle valve control for an internal combustion engine of the type having a main combustion chamber supplied with a lean mixture and an auxiliary combustion chamber supplied with a rich mixture. A spark plug ignites the rich mixture in the auxiliary chamber and the resulting blast of flame passes through a torch nozzle to ignite the lean mixture in the main chamber. Two carburetor throttle valves are interconnected for dependent action through a dashpot, cam and cam follower comprising the dual control to regulate the relative amounts of air-fuel mixture admitted to each chamber as the engine load varies from idling to full throttle. Slow opening of the main throttle valve causes corresponding movement of the auxiliary valve, while abrupt opening of the main throttle valve causes the auxiliary throttle valve to open widely and then assume the opening determined by the cam and cam follower.

7 Claims, 3 Drawing Figures

DUAL THROTTLE VALVE CONTROL FOR INTERNAL COMBUSTION ENGINE

This invention relates to internal combustion engines and is particularly directed to engines of the type having a main combustion chamber and an auxiliary combustion chamber and a torch nozzle connecting two chambers. A spark plug ignites a rich combustible mixture in the auxiliary chamber and the blast of flame issues through the torch nozzle to ignite and burn the lean combustible mixture in the main chamber. A first throttle valve is required for the rich mixture and a second throttle valve is required for the lean mixture.

To minimize objectionable exhaust emissions to the atmosphere, it is necessary to operate the engine with optimum characteristics irrespective of the engine speed for other operating conditions. It is desirable to control the rich mixture supplied to the small auxiliary combustion chamber in a manner so that the air-fuel ratio may be best suited for spark ignition. On the other hand, it is desirable to control the air-fuel ratio of the mixture to be supplied to the large main combustion chamber in a manner so that the mixture may be ignited surely and burn quickly under the effect of combustion flames being projected from the torch nozzle connecting the two chambers.

In accordance with this invention, a novel dual control device for the two carburetor throttle valves is employed to enable the engine to operate at all times with the desired air-fuel ratio characteristic. Specifically, the control device is designed to control the ratio between the flow of lean-fuel mixture being supplied directly to the main combustion chamber, and the flow of rich air-fuel mixture being supplied directly to the small auxiliary combustion chamber. In this type of engine it is necessary that when the main throttle valve is opened slowly by the accelerator pedal or the like, the auxiliary throttle valve also opens slowly, but when the main throttle valve is abruptly opened, the auxiliary valve be immediately opened widely and then allowed to adjust to a position determined by the accelerator pedal. The dual control accomplishes this by making the movement of the auxiliary throttle valve dependent on the movement of the main throttle valve. By this means the air fuel ratio of the rich mixture as ignited in the auxiliary combustion chamber is controlled so as to keep it best suited for spark ignition, and the air fuel ratio of the lean mixture is controlled to promote opitimum burning in the main combustion chamber.

The object of the present invention is to make it possible to form a mixture of such air-fuel ratio characteristic that the amounts of nitrogen oxides and unburned hydrocarbons may be reduced to as low a level as possible, irrespective of the operating conditions of the engine.

Other objects and advantages will be apparent from the following detailed description taken in conjunction with the accompanying drawings.

Figure 1:
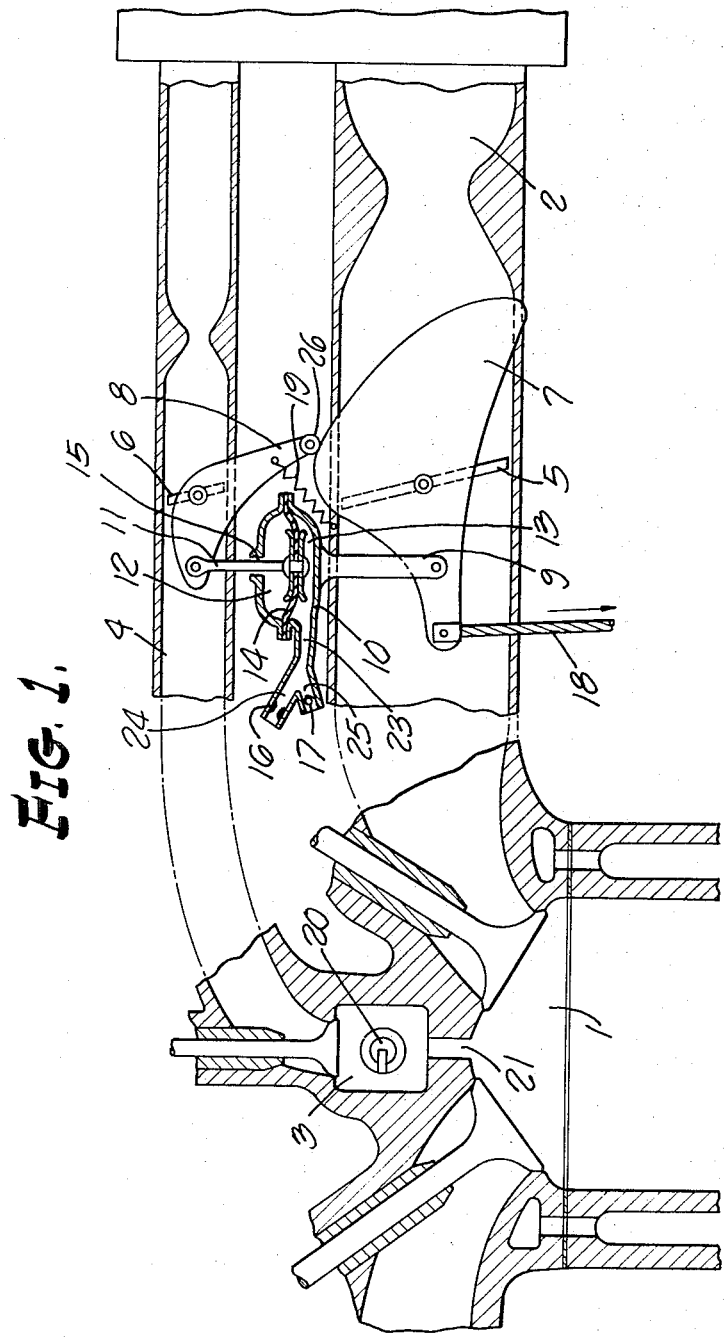
FIG. 1 is a sectional side view showing a preferred embodiment of the present invention.
Figure 2:
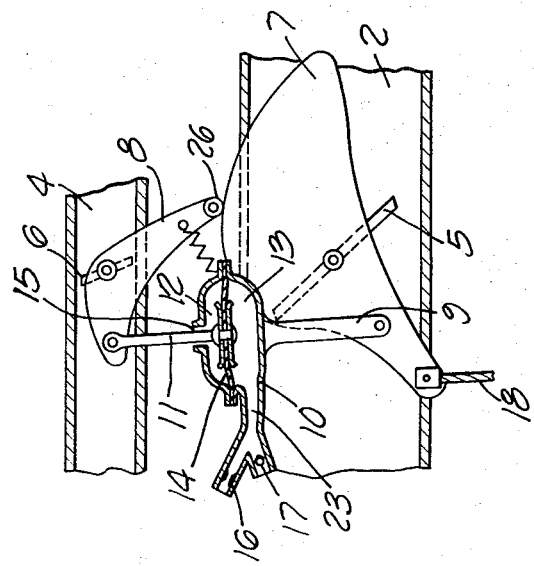
FIG. 2 is a sectional side view of the preferred embodiment of the invention when the main throttle valve is abruptly opened.

Referring now in detail to the drawings, the internal combustion engine is seen to have a main combustion chamber 1, a main intake passage 2 communicating therewith, an auxiliary combustion chamber 3 and an auxiliary intake passage 4 communicating with the auxiliary combustion chamber. A main throttle valve 5 is disposed within the main intake passageway and an auxiliary throttle valve 6 is disposed within the auxiliary passageway 4. A cam 7 is secured to throttle valve 5 and a cam follower 8 is secured to the auxiliary throttle valve 6. Biasing means 19 are provided to urge the cam follower against the cam. A dashpot 22 is operatively interposed between the cam 7 and cam follower 8 and is comprised of a casing 10, diaphragm 14, upper actuating rod 11 and lower actuating rod 9. The diaphragm 14 extends across the interior of the casing defining an upper chamber 12 and lower chamber 13. The upper actuating rod 11 is secured to diaphragm 14 at one end and extends through aperture 15 in casing 10 and is pivotally connected to the cam follower 8. The lower actuating rod 9 extends from the underside of casing 10 and is pivotally connected at its extended end to cam follower 7. As shown in the drawings, upper chamber 12 is vented to the atmosphere through aperture 15 and lower chamber 13 is open to the atmosphere through orifice 16. A check valve 17 communicates with lower chamber 13 and is in parallel with orifice 16. In the preferred embodiment shown in the drawings, the lower chamber 13 communicates with a bifurcated passageway 23, one arm 24 of the passageway terminating in orifice 16 and the other arm 25 of said passageway carrying check valve 17.

The main combustion chamber 1 is supplied with a relatively lean air-fuel mixture through the main intake passageway 2. The flow rate of this lean mixture can be adjusted by the main throttle valve 5. Similarly, a relatively rich mixture is supplied to the auxiliary chamber 3 through passageway 4 and the flow rate of this rich mixture is similarly varied by turning the auxiliary throttle valve 6. A spark plug 20 is provided within auxiliary chamber 3 to ignite the rich mixture therein. The flame produced thereby is injected through a torch nozzle 21 into the main combustion chamber 1 to ignite the lean mixture therein.

The main throttle valve 5 and the auxiliary throttle valve 6 are operatively connected as described above to enable the auxiliary throttle valve to operate in dependent fashion with operation of the main throttle valve 5. An accelerator wire 18 is connected to the cam 7 such that pulling on the wire causes counterclockwise rotation of the cam. In operation, when the cam 7 is slowly rotated by the pull of the accelerator wire 18, the main throttle valve 5 is slowly opened. See FIG. 1. The auxiliary throttle valve 6 is similarly slowly opened at a rate determined by the operating surface 7' of the cam 7 as the cam follower 8 moves therealong, causing rotation of the auxiliary throttle valve. In the preferred embodiment, a follower roller 26 is provided on the follower for smoother movement between the follower and cam. In this manner, the desired relative flow rates are obtained through the main and auxiliary throttle valves.

Figure 3:
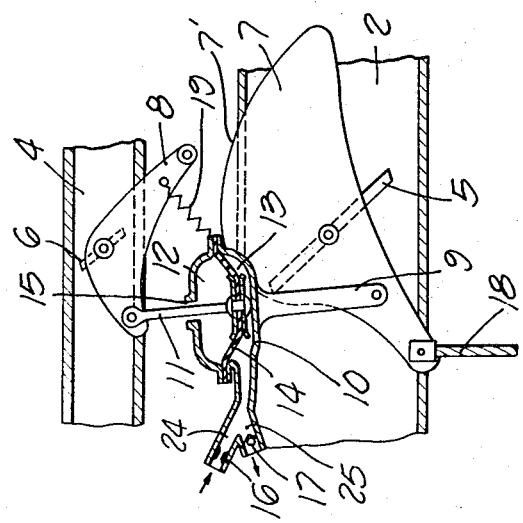
FIG. 3 is a sectional side view of the preferred embodiment of the invention after the main throttle valve has been abruptly opened and the auxiliary throttle valve has assumed a position determined by the cam and cam follower.

However, when the main throttle valve is abruptly opened by an abrupt pull of the accelerator wire 18, the follower arm 8 is lifted from the cam and the auxiliary throttle valve 6 is opened wide. At this time the casing 10 is forced downwardly. Pressure is then applied to the cam follower through biasing means 19 and atmospheric air is supplied slowly through orifice 16 into the lower chamber 13. Air cannot pass through the check valve 17 in this direction and so the diaphragm moves upward more slowly, expanding lower channel 13, as shown in FIG. 3 until the follower 8 is returned to contact with the operating surface of cam 7. Thus the auxiliary throttle valve 6 returns to an opening determined by the accelerator pedal through the position of the follower 8 on cam 7. The time lag is desirable due to the dual combustion chamber configuration of the engine and its duration is, of course, determined by the size of orifice 16. If the main throttle valve 5 were closed, auxiliary valve 6 would similarly close through the above described operation and return to the state illustrated in FIG. 1.

From the above can be seen that when the main throttle valve 5 is slowly opened, auxiliary throttle valve 6 is also opened relatively slowly at a rate determined by cam 7. However, when the main throttle valve is abruptly opened, the auxiliary valve opens wide regardless of cam 7 and then returns to an exact opening determined by the positioning of the follower 8 on the operating surface of cam 7. In this manner precise correlation between the flow rate of the lean and rich mixtures into the main and auxiliary combustion chambers is attained through all ranges of operation.

Various changes and modifications may be made in carrying out the present invention without departing from the spirit and scope thereof. Insofar as these changes and modifications are within the purview of the appended claims they are to be considered as part of the invention.

We claim:

1. A dual throttle valve control for use in an internal combustion engine of the type having a main combustion chamber, an auxiliary combustion chamber and a torch nozzle establishing communication therebetween, said valve control comprising means including a first throttle valve for supplying a lean mixture to the main combustion chamber means including a second throttle valve for supplying a rich mixture to the auxiliary combustion chamber, a cam carried by said first throttle valve, a cam follower carried by said second throttle valve, biasing means urging said cam follower against said cam, and means for opening said second throttle valve beyond a position determined by said cam upon said first throttle valve being abruptly opened.

2. The combination of claim 1 wherein the latter said means controls the return of said cam follower to engagement with said cam, said means being pivotally secured to said cam and said cam follower.

3. The combination of claim 1 wherein the latter said means comprises a dashpot, said dashpot having a diaphragm therein, said diaphragm carrying a first rod and extending across the interior of said dashpot defining an upper and lower chamber therein, said rod being pivotally secured to said cam follower, a second rod carried by said dashpot and pivotally secured at the extended end thereof to said cam, means defining an air entry for said lower chamber and a check valve allowing air flow therethrough from said lower chamber.

4. In an internal combustion piston engine having a main combustion chamber and an auxiliary combustion chamber connected by a torch nozzle, and having a main intake passage for supplying a lean mixture to said main chamber, and an auxiliary intake passage for supplying a rich mixture to said auxiliary chamber, the improvement comprising, in combination: a main throttle valve in the main intake passage, an auxiliary throttle valve in the auxiliary intake passage, means for turning said main throttle valve toward open position, means for coordinating the movement of the auxiliary throttle valve with the movement of the main throttle valve to maintain a predetermined relationship, the latter said means including a dashpot device having an expansible chamber connected to a restricted orifice, whereby fluid passes between said expansible chamber and the orifice when the main throttle valve is opened slowly to maintain said predetermined relationship, and whereby abrupt opening movement of the main throttle valve allows insufficient time for such fluid flow and thereby causes opening movement of the auxiliary throttle valve in excess of said predetermined relationship.

5. The combination set forth in claim 4 wherein the coordinating means comprises a cam fixed relative to the main throttle valve and a cooperating follower fixed relative to the auxiliary throttle valve.

6. The combination set forth in claim 4 in which atmospheric air enters the expansible chamber through said orifice when the main throttle valve is opened slowly.

7. The combination set forth in claim 4 in which one wall of said expansible chamber comprises a flexible diaphragm.

* * * * *